United States Patent
Hodgson et al.

(10) Patent No.: US 8,336,176 B2
(45) Date of Patent: Dec. 25, 2012

(54) METHOD AND TOOL FOR PRODUCING STRUCTURED SHEET METAL LAYERS, METHOD FOR PRODUCING A METAL HONEYCOMB BODY, AND CATALYST CARRIER BODY

(75) Inventors: Jan Hodgson, Troisdorf (DE); Michael Voit, Leverkusen (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 978 days.

(21) Appl. No.: 11/199,396

(22) Filed: Aug. 8, 2005

(65) Prior Publication Data

US 2005/0274012 A1    Dec. 15, 2005

Related U.S. Application Data

(63) Continuation of application No. PCT/EP2004/000788, filed on Jan. 29, 2004.

(30) Foreign Application Priority Data

Feb. 6, 2003   (DE) .................................. 103 04 814

(51) Int. Cl.
*B21D 31/04* (2006.01)
(52) U.S. Cl. ............................. 29/6.1; 29/890; 29/896.6
(58) Field of Classification Search .............. 29/890.12, 29/451, 407.02, 407.03, 6.1, 890, 890.08, 29/896.6; 285/335–380; 422/181
See application file for complete search history.

(56) References Cited

U.S. PATENT DOCUMENTS

| | | | |
|---|---|---|---|
| 3,279,043 A * | 10/1966 | Wirt | 29/896.6 |
| 3,318,128 A | 5/1967 | Eugene et al. | |
| 4,098,722 A | 7/1978 | Cairns et al. | |
| 4,275,581 A | 6/1981 | Miller | |
| 4,418,558 A * | 12/1983 | Simmons | 72/177 |
| 5,130,208 A | 7/1992 | Maus et al. | |
| 5,200,013 A | 4/1993 | Traber | |
| 5,375,446 A * | 12/1994 | Hein | 72/186 |
| 5,983,692 A * | 11/1999 | Bruck | 72/187 |
| 6,354,368 B1 * | 3/2002 | Nishishita et al. | 165/135 |
| 6,761,980 B2 * | 7/2004 | Sato et al. | 428/593 |

(Continued)

FOREIGN PATENT DOCUMENTS

DE    457936    4/1929

(Continued)

OTHER PUBLICATIONS

Japanese Office Action dated Jul. 8, 2008.

(Continued)

*Primary Examiner* — Jermie Cozart
*Assistant Examiner* — Christopher Koehler
(74) *Attorney, Agent, or Firm* — Laurence A. Greenberg; Werner H. Stemer; Ralph E. Locher (57) ABSTRACT

A method for producing multiple structured sheet metal foils includes the steps of A) reshaping the sheet metal foil to produce a primary structure having a first primary structure width; B) reshaping the sheet metal foil having the primary structure to produce a secondary structure; and C) reshaping the structured sheet metal foil to produce a second primary structure width being smaller than the first primary structure width. A method for producing a metal honeycomb body, a catalyst carrier body having multiple structured sheet metal foils for exhaust gas purification and a tool for producing multiple structured sheet metal foils, are also provided.

37 Claims, 3 Drawing Sheets

U.S. PATENT DOCUMENTS

| | | | |
|---|---|---|---|
| 2004/0013580 A1 | 1/2004 | Bruck et al. | |
| 2004/0093704 A1* | 5/2004 | Marlow | 29/6.1 |
| 2005/0115070 A1* | 6/2005 | Sugimoto et al. | 29/890 |

FOREIGN PATENT DOCUMENTS

| | | |
|---|---|---|
| DE | 100 15 498 A1 | 11/2000 |
| DE | 201 17 873 U1 | 2/2002 |
| DE | 201 17 873 U1 | 3/2002 |
| DE | 698 14 904 T2 | 1/2004 |
| DE | 699 28 590 T2 | 8/2006 |
| EP | 0 945 195 B1 | 9/1999 |
| EP | 1 030 153 B1 | 8/2000 |
| GB | 1 301 667 | 1/1973 |
| GB | 1 557 780 | 12/1979 |
| JP | 61089495 A | 5/1986 |
| JP | 63-170023 U | 11/1988 |
| JP | 3036315 U | 4/1991 |
| JP | 4504226 T | 7/1992 |
| JP | 04294135 A | 10/1992 |
| JP | 05007941 A | 1/1993 |
| JP | 6-63418 | 3/1994 |
| JP | 08057549 A | 3/1996 |
| JP | 09049694 A | 2/1997 |
| JP | 11-142079 | 5/1999 |
| JP | 11-267766 | 10/1999 |
| JP | 2001087815 A | 4/2001 |
| JP | 2003-33665 | 2/2003 |
| WO | 9101807 A1 | 2/1991 |

OTHER PUBLICATIONS

English translation of Japanese Office Action dated Mar. 16, 2010.
Japanese Office Action dated Jun. 30, 2009.

* cited by examiner

Step a

Step A

Step B

Step C

METHOD AND TOOL FOR PRODUCING STRUCTURED SHEET METAL LAYERS, METHOD FOR PRODUCING A METAL HONEYCOMB BODY, AND CATALYST CARRIER BODY

CROSS-REFERENCE TO RELATED APPLICATION

This is a continuation, under 35 U.S.C. §120, of copending International Application No. PCT/EP2004/000788, filed Jan. 29, 2004, which designated the United States; this application also claims the priority, under 35 U.S.C. §119, of German Patent Application 103 04 814.6, filed Feb. 6, 2003; the prior applications are herewith incorporated by reference in their entirety.

BACKGROUND OF THE INVENTION

Field of the Invention

The present invention relates to a method for producing structured sheet metal foils and a method for producing a metal honeycomb body. The invention also relates to a catalyst carrier body having multiple-structured sheet metal foils for exhaust systems of mobile internal combustion engines. The invention further relates to a tool for producing multiple-structured sheet metal foils.

In the exhaust emission treatment of mobile internal combustion engines, such as spark-ignition and diesel engines, for example, the use of components or structures providing a relatively large surface in the exhaust line is already known. Those components are usually provided with an adsorbent, catalytically active or similar coating. The large surface of the components ensures close contact with the exhaust gas flowing past. Such components include, for example, filter elements for filtering out particulates contained in the exhaust gas, adsorbers for at least temporary storage of pollutants (such as $NO_x$) contained in the exhaust gas, catalytic converters (for example, three-way catalytic converters, oxidation-type catalytic converters, reduction-type converters, etc.), diffusers for influencing the flow and swirling of the exhaust gas flowing through, or heating elements, which heat the exhaust gas to a predetermined temperature just after cold starting of the internal combustion engine. The following carrier substrates have basically proved suitable for the conditions of use prevailing in the exhaust system of an automobile: ceramic honeycomb bodies, extruded honeycomb bodies and honeycomb bodies made from metal foils. The fact that those carrier substrates can always be adapted to suit their functions means that high temperature-resistant and corrosion-resistant sheet metal foils are especially well-suited to service as basic materials.

The production of honeycomb bodies with a multiplicity of at least partially structured sheet metal foils, which are then inserted into a casing to form a catalyst carrier body, which can be provided with one or more of the aforementioned coatings, is already known. The at least partially structured sheet metal foils are disposed so as to form channels aligned basically parallel to one another. In order to ensure the same, some of the sheet metal foils, for example, are provided with a primary structure, one of the distinguishing features of which is a regular, recurring structure, in particular a type of sinusoidal-shaped corrugation, a saw-tooth structure, a rectangular corrugation, a triangular corrugation, an omega-shaped corrugation, or the like. Those sheet metal foils provided with a primary structure are then stacked one on top of the other (possibly alternating with smooth interlayers), connected together and inserted into a casing. In that way a honeycomb body is formed, which has channels basically parallel to one another.

It is also known to incorporate into such sheet metal foils a second structure, which is intended to prevent a laminar flow forming immediately after the exhaust gas enters the honeycomb body, with the result that no exchange of gas takes place between those areas of the partial exhaust gas flow situated at the center of such a channel and, for example, catalytically active channel wall areas. That secondary structure accordingly provides surfaces for the incident flow, which result in a form of swirling of the partial exhaust gas flows inside such a channel. That leads to an intensive mixing of the partial exhaust gas flows themselves, so that a close contact of the pollutants contained in the exhaust gas with the channel wall is ensured. It is furthermore possible, using such secondary structures, to form flow passages transversely to the channel, which will permit an exchange of gas between partial exhaust gas flows in adjacent channels. For that reason, secondary channels are known which include, for example, baffles, microstructures, protrusions, projections, vanes, plates, holes or the like. In that respect, that results in a significantly greater variety in the manufacture of such metal honeycomb bodies, compared to those of ceramic material, since in the latter case such a complex channel wall can be achieved only at an exceptionally high technical cost, if at all.

It is also particularly important in exhaust emission treatment that the pollutants contained in the exhaust gas should be converted with virtually no delay after starting the engine. That should be done with a particularly high efficiency in accordance with statutory regulations or guidelines. For that reason, the metal foils used have become thinner and thinner in the past. Very thin sheet metal foils mean that the surface-specific heat capacity is very low. That is to say relatively little is extracted from the passing exhaust gas flow and the sheet metal foils themselves experience a temperature increase relatively rapidly. That is important because the catalytically active coatings currently used in the exhaust system only start to convert the pollutants from a certain starting temperature on the order of 230° C. to 270° C. With the aim of converting the pollutants with an efficiency of at least 98% after just a few seconds, sheet metal foils have been used, which have a foil thickness of less than 20 µm, for example.

However, the objectives stated above give rise to a number of production and application problems. The production of such filigree structures, in particular the secondary structures, requires high-precision tooling, which is usually very expensive and which should accordingly have a long service life. At the same time, the fact that both forming and sometimes also cutting production operations have to be performed must be taken into account. In order to save tooling costs, as many machining operations as possible have been integrated in one tool, and increasing tool wear resulting from the layout of the secondary structure has been observed. There is also the problem that the relatively thin sheet metal foils have to be fed at a suitable rate, if possible without being exposed to any undesirable cold deformation. The strain hardening can have an adverse effect on the forming properties of the sheet metal foils. Due to the low material thickness there is moreover the risk of an increased tendency to creasing and/or rolling up on the part of the sheet metal foil. The creases mean, for example, that channels may possibly become clogged or cracks may form which, due to the high thermal and dynamic stresses, will later spread through the exhaust system of an automobile, thereby jeopardizing the structural integrity of the honeycomb body. It must also be remembered that such creased or deformed primary and/or secondary structures present undesirable opposition to the exhaust gas, so that an increased backpressure may possibly be noted upstream of the honeycomb body, which can lead to a reduction in engine power output.

SUMMARY OF THE INVENTION

It is accordingly an object of the invention to provide a method and a tool for producing structured sheet metal layers, a method for producing a metal honeycomb body, and a catalyst carrier body, which overcome the hereinafore-mentioned technical disadvantages of the heretofore-known methods, devices and products of this general type. In particular, the method should be economical and preferably continuous, so as to avoid excessive strain hardening of the sheet metal foils, it should allow the construction of different secondary structures and generate a primary structure that is suited to the production of a catalyst carrier body to be used in the exhaust systems of mobile internal combustion engines, with the catalyst carrier body being intended to have a very low flow resistance, especially in the case of high channel densities and an integrated secondary structure. The tool for producing multiple-structured sheet metal foils should be suitable for introducing particularly complex and aerodynamically favorable structures into thin sheet metal foils and to modifying the same.

With the foregoing and other objects in view there is provided, in accordance with the invention, a method for producing multiple-structured sheet metal foils. The method comprises the following steps:

A) reshaping the sheet metal foil to produce a primary structure having a first primary structure width;
B) reshaping the sheet metal foil having the primary structure to produce a secondary structure; and
C) reshaping the structured sheet metal foil to produce a second primary structure width being less than the first primary structure width.

In accordance with another mode of the invention, it is particularly advantageous if, prior to step A), multiple separating edges are introduced into an inner area of the basically plane sheet metal foil (described below as step a).

In order to avoid repetition, the individual steps of the method will be denoted below solely by the corresponding letters.

It must be noted from the outset that the invention departs from the concept, based on cost grounds, of carrying out the production method so that as many reshaping operations as possible are performed simultaneously and/or in one tool. In this respect the steps a), A), B) and C) described are to be thought of as steps in the method which, in particular, run independently and separately from one another. This also means, in particular, that first (only) the separating edges, then the primary structure followed by the secondary structure and then the reduced primary structure width, are produced in sequence. Such a sequential, step-by-step production means, for example, that any premature fatigue of the sheet metal foil while still in service in the exhaust system of an automobile is avoided, since strain hardening due to high degrees of deformation occurs to a significantly lesser extent. It is also to be noted that this results in reduced stressing of the tool, so that wear to the bending and forming edges thereof is significantly reduced. At the same time it should again be clearly stated that even with a method of producing multiple-structured sheet metal foils in just two or three separately performed operations, a sheet metal foil is ultimately produced which has a primary structure having a second primary structure width and a secondary structure. For this reason none of the steps a), A), B) and C) is ultimately omitted entirely. The steps are rather combined with one another or performed simultaneously with one another, for example in one tool.

Especially preferred variants of the method for producing multiple-structured sheet metal foils will be described below. Bracketed letter combinations represent combined or simultaneously performed steps: a+A+B+C; (a+A)+B+C; (a+A)+(B+C); a+A+(B+C); (a+A+B)+C; a+(A+B)+C. With regard to step a) it should again be pointed out that this can possibly be integrated directly into step B), that is to say precisely when the sheet metal foil provided with a primary structure is being reshaped, in such a way that the separation of material occurs, that is to say the separating edges are produced simultaneously with the secondary structure. In this case the following variants of the method would be particularly preferred: A+a/B+C; (A+a/B)+C, wherein the term "a/B" represents the simultaneous production of separating edges and secondary structure. In principle a two-stage structuring of the individual operations is particularly preferred, at precisely which point it should be ensured that the steps B) and C) are not undertaken together in one step or in one operation, but rather that each step B) and C) is performed at another stage or using another tool or at another time.

The following detailed points should be noted with regard to the steps in the method:

Regarding Step a) With regard to this step, a basically unformed sheet metal foil is to be assumed, by which it is meant that this sheet metal foil is preferably drawn off directly from a coil. The sheet metal foil is formed of a temperature-resistant, corrosion-resistant material preferably having relatively high proportions of aluminum, chromium, molybdenum or equivalent constituents. The term "plane" is in this context taken to mean that no structure has yet been introduced, and the sheet metal foil therefore extends basically in two dimensions. In view of the fact that the steps in the method for producing multiple-structured sheet metal foils are performed at least largely without any interruption, a sheet metal foil is herein intended to imply a so-called "continuous" sheet metal foil, that is to say a sheet metal foil which does not yet have the dimensions which it will ultimately have when in use, for example as a catalyst carrier body for catalytically active coatings. In this respect the introduction of separating edges is not to be taken to mean that this "continuous" sheet metal foil is cut to shape in this case, but rather that the sheet metal foil largely retains its length. Instead of the complete separation of partial areas of the sheet metal foil it is proposed herein to provide multiple separating edges in an inner area. This means that at least some of the separating edges are completely enclosed by the material of the sheet metal foil, that is to say forming a type of slit, crack, opening, hole or the like. The separating edges are at the same time preferably disposed in a regular pattern, for example in lines or columns at regular distances. It is in turn possible to construct these patterns differently in partial sections of the sheet metal foil, that is, for example, to allow greater distances between the separating edges in one section than in another.

The separating edges themselves may have different functions. Thus these separating edges, for example, may serve to ensure a gentle engagement of the reshaping tool for forming the secondary structure. The separating edge may further be used to align the sheet metal foil in relation to the succeeding reshaping tools. It is particularly advantageous, however, for the separate production to result in very precisely aligned and executed separating edges. In this way creases and deformations of the sheet metal foil in subsequent machining operations are avoided.

Regarding Step A) The reshaping of the sheet metal foil so that a primary structure having a first primary structure width is produced is preferably continuous. Two production methods in particular, corrugation rolling and roller bending, lend themselves to the production of such a primary structure. In these bend reshaping methods, rotating or turning profile rolls are used, which mesh with one another as the sheet metal foil is fed through them. In corrugation rolling, the sheet metal foil is in contact with the sides or flanks of both intermeshing profile teeth throughout the reshaping process, whereas in roller bending a mutual contact generally occurs only in the area of the profile tooth head or tip or the profile tooth foot or base. In each case a primary structure is generated, the bending plane of which is basically perpendicular to the axis of the rotating tools. This step in the method is generally performed in such a way that during the reshaping of the sheet metal foil very small, if any, tensile forces are introduced into the sheet metal foil. The reshaping process is therefore largely attributable to pure bending. This is achieved, for example, in that a gap is provided between the forming tools through which the sheet metal foil is fed. The gap is greater in extent than the thickness of the sheet metal foil. This can serve to prevent the sheet metal foil from becoming jammed at any point, thus obstructing the feed. As a result, the reshaped sheet metal foil will have no material defects, which might be a cause of premature failure, particularly when used as a catalyst carrier body. The preferred method of executing the reshaping processes without introducing tensile forces is, in particular, also to be followed when performing at least one of the succeeding steps B) and C).

Regarding Step B) According to step B), the pretreated sheet metal foil already provided with a primary structure is now provided with a secondary structure. The secondary structure is superimposed on the primary structure, that is to say it locally modifies or breaks up the primary structure. Thus it is possible, for example, for the primary structure to be at least partially undone, replaced by another and/or intensified. The position on or in the sheet metal foil may serve as a criterion for distinguishing between primary structure and secondary structure. On one hand, the primary structure can generally be recognized simply by looking at the edge of the sheet metal foil which extends parallel to the direction of the "continuous" sheet metal foil. The basic shape or primary structure is usually clearly discernible from this edge. The secondary structure, on the other hand, is often more readily discernible from the edges of the metal foil running perpendicular thereto as a modification to the basically straight edge. This is particularly true of intermittent, that is to say locally recurring, secondary structures.

Regarding Step C) In this reshaping step, the primary structure of the sheet metal foil, now already provided with two structures, is machined yet again. As a result of this reshaping step, the primary structure acquires a second primary structure width, which is less than the first primary structure width after the reshaping step A). In other words, the structure is forced together, gathered up, more tightly compressed or telescoped, etc. A primary structure width is understood in this case to mean the distance between two identically aligned extremes of the structure adjacent one another. If the primary structure is a corrugation with peaks and valleys, for example, the primary width is the distance between two peaks which directly succeed one another in the course of the corrugation. The main effect of reducing the primary structure width is to shift the extremes closer together, with the sheet metal foil areas lying between the extremes falling and rising more steeply.

Producing the primary structure in two steps has advantages particularly with regard to superimposition of the secondary structure. Producing the primary structure and the secondary structure simultaneously, particularly with very small primary structure widths, requires very delicate tools, since the secondary structure is largely disposed in the area of the extremes of the primary structure. Small primary structure widths also result in relatively confined extremes, so that additional separating or reshaping steps have to be performed at the slender end faces of the filigree tools. This leads to increased wear of the tool end faces and due to the high degree of reshaping of the sheet metal foil brings the risk of creasing. Gathering up or pushing the primary structure together at a subsequent stage means that more solid tools can be used to produce the secondary structure, thereby significantly increasing the service life of the tools, so that significantly more sheet metal foils can be machined using the same tool.

In accordance with a further mode of the invention, the introduction of the separating edges is achieved by using at least one of the following production processes:
A) cutting,
B) pressing,
C) stamping,
D) drilling, or
E) etching,
thereby producing multiple passages. For clarification, it should be noted herein that the passages are at least partially defined by the separating edges. In this case, the term passages preferably relates to basically rounded contours, such as circular, elliptical or similar, relatively large holes. The passages preferably have a maximum distance ranging from 0.2 to 6 mm in relation to opposing separating edges. It is advantageous to select one of the aforementioned methods according, in particular, to the material of the sheet metal foil and the size and/or number of the passages.

During cutting, the sheet metal foil is subjected to cutting forces by a cutting punch. A cutting plate into which the cutting punch can penetrate is provided on the side remote from the cutting punch. Increasing the force acting on the sheet metal foil causes the cutting punch to penetrate into the foil, with the material being plastically deformed. When the fluidity or metal plasticity of the material in the shear zone is exhausted, cracks generally emanating from the cutting plate occur, which lead to separating of the material through fracture and hence to the formation of separating edges.

During pressing, use is basically made of the same principle, but in pressing it is possible to form not only a passage but also a flange close to the separating edge. The difference between cutting and stamping is that in stamping a hollow cutting punch is preferably selected and the separating process is performed on a basically plane cutting plate, into which the cutting punch does not penetrate.

With thicker materials, or where multiple sheet metal foils together are to be provided with separating edges, drilling with a rotary tool may also be used as a production process.

If especially small passages are to be produced, particularly in very thin foils, this can also be done, for example, by a hole mask, which is placed on the sheet metal foil. An etching medium is then applied to the sheet metal foil through this hole foil, resulting in a chemical decomposition of the sheet metal foil in a desired area.

It should be noted with regard thereto that the person skilled in the art will be familiar with these production methods and will be in a position to select a suitable production process A to E specific to the application.

In accordance with an added mode of the invention, during the first reshaping step A) the sheet metal foil is bent by intermeshing profile teeth so that a basically regular, recurring corrugation is produced as the primary structure. These intermeshing profile teeth are preferably part of rotating tools, which produce the primary structure by the corrugation rolling or corrugation bending production method. A basically sinusoidal form of corrugation is preferably produced in the process.

In accordance with an additional mode of the invention, steps a) and A) are performed by a first tool, step a) preferably is the cutting production method and/or the primary structure is produced in step A) by the corrugation rolling production method. The combination of steps a) and A) proposed herein is of particular interest from cost and time standpoints. Neither of the steps requires any degree of reshaping of the sheet metal foil, which might lead to a tendency to creasing, so that despite the simultaneous processing it is possible in this case to achieve high degrees of precision without any unwanted destruction of the sheet metal foil.

In accordance with yet another mode of the invention, a secondary structure having a secondary structure width which is less than a first primary structure width, in particular less than 80%, preferably less than 55%, is produced during the second forming step B). This means that the secondary structure does not extend over an entire primary structure width. It is worth noting here that the primary structure width and the secondary structure width are disposed parallel to one another. This relates in particular to secondary structures which form separate edges for the incident flow, baffles, vanes and the like.

In accordance with yet a further mode of the invention, the secondary structure has a striated construction, preferably extending along extremes of the primary structure. Such striated secondary structures extending along the extremes, that is to say peaks or valleys, serve, for example, to increase the structural integrity, to set the positions of metal foils disposed adjacently one another or to define coating areas.

In accordance with yet an added mode of the invention, the secondary structure has an intermittent construction, preferably extending parallel to extremes of the primary structure. This means that more than one and in particular a plurality of secondary structures, which are preferably disposed equidistant from one another, is situated on one extreme of the primary structure. A parallel configuration is understood in this case to mean both the configuration directly along the extremes as well as parallel thereto in an area of the sheet metal foil between adjacent extremes. Such intermittent secondary structures serve in particular to influence the partial exhaust gas flows when such a sheet metal foil is used to produce a catalyst carrier body.

Figure 1:
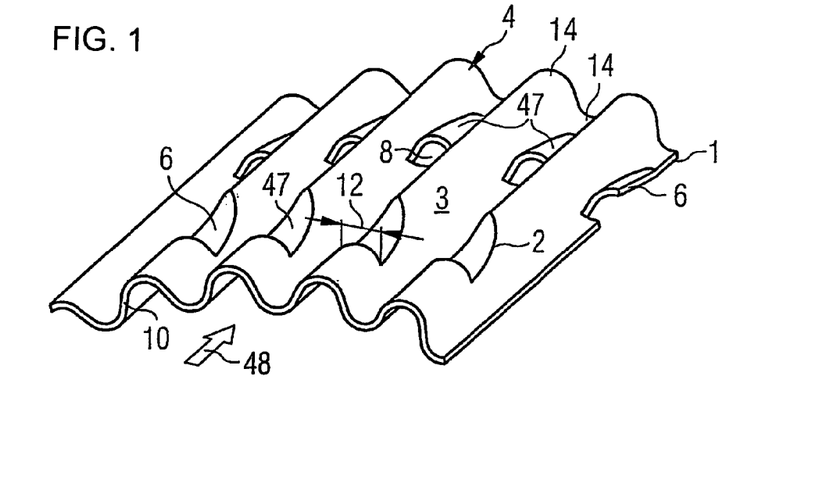
FIG. 1 is a diagrammatic, perspective view of a first embodiment of a multiple-structured sheet metal foil.

In accordance with yet an additional mode of the invention, the secondary structure is constructed in such a way that it forms passages in the sheet metal foil. This may mean, on one hand, that the secondary structure is at least partially defined by the passages, although it is also possible for passages to be situated in an inner area of the secondary structure. To illustrate this, reference should be made to a secondary structure like that represented in FIG. 1, for example. The secondary structure shown therein takes the form of a baffle, which forms a passage. In this case it is a passage at least partially defined by the secondary structure. A passage in the secondary structure itself would be created if the baffle shown were again provided with a hole or the like. With regard to the production method it is possible in this case for the separating edges produced during step a) to constitute holes, which ultimately occur in the baffle itself, while a further passage, that shown in FIG. 1, is formed when generating the actual secondary structure.

In accordance with again another mode of the invention, the shaping step C) gives rise to a second primary structure width, which is less than 80%, in particular 60% of the first primary structure width. It is furthermore advantageous for the shaping step C) to produce a first primary structure height, which is less than 80%, in particular 60%, of the second primary structure height. The degree of shaping is determined on the basis of the change in the primary structure width and the primary structure height. The same or a different percentage modification may occur in each case, according to the desired second primary structure width or second primary structure height.

In accordance with again a further mode of the invention, during shaping step C), segments of a second tool intermesh in the primary structure formed by the extremes. This means, in particular, that a guided compression or reduction of the primary structure width takes place in this case. This permits an especially gentle shaping of the sheet metal foil.

In accordance with again an added mode of the invention, the shaping step C) should be performed simultaneously with the shaping step B), preferably by just one second tool. This is advantageous for reasons similar to those given for combining steps a) and A) of the method. Reference should be made inasmuch to the explanations above.

In accordance with again an additional mode of the invention, the multiple-structured sheet metal foils are produced from high temperature-resistant and corrosion-resistant material having a foil thickness of less than 0.05 mm, in particular less than 0.03 mm, preferably less than 0.015 mm. Furthermore, the method proposed herein is particularly advantageous when producing multiple-structured sheet metal foils having a first primary structure width of less than 3 mm, in particular less than 2.6 mm, and preferably less than 2.2 mm. The method can furthermore preferably be used to produce multiple-structured sheet metal foils having a second primary structure height of more than 1.5 mm, in particular more than 1.8 mm and preferably more than 2.0 mm. The parameters quoted herein in particular describe multiple-structured sheet metal foils, which are used to produce catalyst carrier bodies for widely varying coatings in exhaust systems of mobile internal combustion engines.

With the objects of the invention in view, there is furthermore provided a method for producing a metal honeycomb body having at least partially structured sheet metal foils. The method comprises producing at least one sheet metal foil according to the invention, and subsequently stacking and/or winding the at least one sheet metal foil to form a honeycomb body having a multiplicity of channels at least partially defined by the primary structure.

In accordance with another feature of the invention, sheet metal foils of the honeycomb body are joined to one another and/or to a casing at least partially enclosing the honeycomb body, in particular by a brazing process.

In accordance with a further feature of the invention, the at least one sheet metal foil forming the honeycomb body is at least partially providing with a coating.

With the objects of the invention in view, there is also provided a catalyst carrier body for exhaust gas systems of mobile internal combustion engines. The catalyst carrier body comprises at least one honeycomb body having a multiplicity of at least partially structured sheet metal foils and a casing. The at least one honeycomb body has at least one multiple-structured sheet metal foil with a primary structure and a secondary structure. The primary structure has a ratio of a primary structure width to a primary structure height of less than 2, in particular less than 1.5.

The multiple-structured sheet metal foils are in particular produced according to one of the developments outlined above of the method for producing a multiple-structured sheet metal foil.

As already explained in the introduction hereto, such catalyst carrier bodies usually have a multiplicity of channels basically disposed parallel to one another, though which an exhaust gas can flow. In order to form such channels, multiple-structured and/or smooth sheet metal foils are connected to one another and inserted into a casing. The sheet metal foils may be helically wound or first formed into stacks before being coiled in an S-shape or in some similar manner. As viewed from the end face, the adjoining sheet metal foils, at least in the inlet area, usually form closed channels having a specific cross-sectional shape. This cross-sectional shape of the channels is in principle freely selectable, with the area or the channel diameter depending heavily on the desired channel density. The term channel density is understood in this case to mean the number of channels per unit of cross-sectional area of the catalyst carrier body. The channel densities are usually on the order of more than 200 cpsi, in particular 400 cpsi and preferably 600 cpsi. The unit "cpsi" signifies "cells per square inch", wherein 1 cpsi corresponds approximately to one channel per 6.4516 $cm^2$.

Another possible way of describing the channels is to specify parameters of the sheet metal foil defining them. In this case it is proposed that the ratio of the primary structure width to the primary structure height should be less than 2. That is to say the primary structure width is no more than twice the primary structure height. Given such a configuration of the primary structure, relatively narrow channels are formed, in other words the extremes of the primary structure are situated relatively close to one another. This also means that the areas of the sheet metal foil between the extremes run relatively steeply.

One particular result of this is that only very small wedges or gussets are formed close to the contact areas of the adjoining sheet metal foils. In the production of catalyst carrier bodies, these wedges or gussets are preferably used for the uniform distribution of brazing material. For this purpose, the honeycomb body of the desired construction is immersed by its end face in a brazing material. The brazing material in the wedges or gussets wets the wedges or gussets right through the entire honeycomb body due to capillary action, even against the force of gravity, provided that no passivation agents are used, which interrupt this capillary action. The development of the primary structure proposed in this case means that the capillaries are very small, so that only a relatively small quantity of brazing material collects in proximity to the contact areas of the sheet metal foils disposed adjacently one another. A smaller quantity of brazing material is thereby ultimately distributed in the interior of the honeycomb body. In addition to cost advantages, this also has the positive effect that a honeycomb body or a catalyst carrier body having a particularly long service life even under extremely corrosive conditions can be produced in a highly reliable process. The reason for this is that the small quantity of brazing material does not attack the sheet metal foils, as normally occurs due to the affinity for alloy elements of the sheet metal foil, thereby possibly leading to local depletion of alloys in the sheet metal foil. This effect, which is even more markedly apparent when sheet metal foils are used which have a foil thickness of less than 20 μm, for example, is avoided by the multiple-structured sheet metal foils proposed herein.

However, the smaller wedges or gussets not only have an advantageous effect on the joining technique but can also serve to reduce the quantity of coating on the catalyst carrier body. The coating is applied to the surface of the carrier structure in a similar way to the liquid brazing material. Due to the smaller capillaries, a reduced quantity of wash coat and catalytically active elements (platinum, rhodium, etc.) also suffices in this case, while at the same time still producing a uniformly thin coating and without adversely affecting the efficiency with regard to the conversion of pollutants contained in the exhaust gas.

Instead, the effects described above give rise to another effect, that is to say a reduced pressure loss or back pressure upstream of the carrier structure. The fact that both brazing material and coating are positioned in the channels results in a larger channel flow cross-section for the same channel density. This also means that the secondary structure projecting into the channel, for example, is less subject to stresses, that is to say it will withstand the ambient conditions in the exhaust system for longer periods. At the same time, the intensive contact of the exhaust gas with the channel wall coated with catalytically active substances next to the secondary structure is also assisted by the relatively narrow construction of the channel. The reason for this is that each partial exhaust gas flow inside such a channel flows past relatively close to one or two opposing channel walls running virtually parallel or at a shallow angle to one another. This greatly increases the probability of contact between the pollutants contained in the exhaust gas and the catalysts, resulting in their conversion.

With the objects of the invention in view, there is additionally provided a tool for producing multiple-structured sheet metal foils from a sheet metal foil with a primary structure being fed to the tool. The tool comprises segments disposed at an interval from and preferably parallel to one another in direction of the primary structure, and a device for varying or adjusting the interval.

That is to say, in other words, the tool is suitable for seating and guiding an already pre-structured sheet metal foil. The seat or guide, which is constructed in this case with segments, serves among other things to advance or convey the sheet metal foil through the tool. As already described above with reference to the method, this tool forms the already structured sheet metal foil in such a way that a second primary structure width is produced, which is less than the first primary structure width of the already structured sheet metal foil. The segments described herein are brought into engagement with the existing primary structure, that is to say in particular the segments are in contact with a multiplicity of the extremes, in particular with each extreme in one alignment (that is, for example, corrugation peaks or corrugation valleys) in a specific section of the sheet metal foil or preferably with each extreme of the primary structure (that is corrugation peaks and corrugation valleys) in a section of the sheet metal foil. It is particularly advantageous to bring the segments into engagement with the primary structure from both sides of the sheet metal foil, since in this way an especially symmetrical stressing and uniform reshaping is produced. This effect is achieved to an exceptional degree if the segments are alternately in contact from different sides with a respective peak and adjacent valley.

In order to reduce the primary structure width, the segments are disposed in the tool in such a way that they are variable in their alignment relative to one another. The function of the variable interval will now be briefly explained for a particular embodiment of the tool. Looking at such a tool, which includes a basically plane plate, for example, along which the corrugated sheet metal foil slides and such segments each engage in the corrugation valleys of the primary structure of the sheet metal foil (only) from above, it will be seen that these are basically at an interval which corresponds to the first primary structure width of the sheet metal foil. Now, with the aid of various measures such as a drive, springs, a guide or stops, the segments are moved towards one another, so that the interval between them is reduced. In the case described herein, in which the first interval basically corresponds to the first primary structure width, the interval is reduced to the same extent as the desired reduction in the primary structure width. That is to say, after the reshaping step, the segments are at an interval from one another which basically corresponds to the second primary structure width. It will be clear from this example that, given a configuration of the segments prior to the reshaping step with a multiple of the first primary structure width or a fraction of the first primary structure width, the intervals from one another will simply also vary correspondingly.

In this way, it is in particular possible to obtain sheet metal foils or catalyst carrier bodies having particularly steep channel walls, which have the advantages already explained above. Such a guided partially interlocking reduction of the primary structure width is particularly gentle, so that this reshaping step can be used for especially thin sheet metal foils, in particular those having a foil thickness of less than 30 µm.

In accordance with another feature of the invention, the interval between the segments can be reduced by at least 15%, in particular at least 25% and preferably even by at least 35%. That is to say, the segments, during the reshaping step, can move towards one another. At the same time, a greater reduction of the interval produces a greater deformation of the structured sheet metal foils so that, in particular, significantly smaller ratios of the second primary structure width to the second primary structure height, ranging from 1.0 to 1.3, for example, can also be produced.

In accordance with a further feature of the invention, the segments are disposed at the same interval from one another over their extent. That is to say, for example, the central axes of the segments are disposed parallel to one another and are therefore at the same interval from one another. At the same time the segments are preferably aligned so that the central axes are oriented perpendicular to the sheet metal foil in the contact area.

In accordance with a concomitant feature of the invention, at least some of the segments have at least one embossing element for producing a secondary structure in the sheet metal foil already provided with a primary structure. This means that the tool described herein is able, in particular, to perform the aforementioned steps B) and C) of the method simultaneously. This applies, in particular, where the secondary structures are disposed in the area of the extremes of the primary structure, since in this area the segments are already in contact with the sheet metal foil. The embossing element itself may take the form of a projection, protrusion or other elevation in the material of the tool or the segment, although it is also possible to provide a special pin, stud, punch or some similar element, which permits a relative movement in relation to the segment. This means, for example, that in a first step the segments come into engagement with the primary structure, before the punches are traversed in order to form the secondary structure, and the primary structure width of the sheet metal foil is then finally reduced.

Other features which are considered as characteristic for the invention are set forth in the appended claims.

Although the invention is illustrated and described herein as embodied in a method and a tool for producing structured sheet metal layers, a method for producing a metal honeycomb body, and a catalyst carrier body, it is nevertheless not intended to be limited to the details shown, since various modifications and structural changes may be made therein without departing from the spirit of the invention and within the scope and range of equivalents of the claims.

In this regard, it is noted that the particularly advantageous developments described in the claims are capable of any suitable combination with one another.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Referring now to the figures of the drawings in detail and first, particularly, to FIG. 1 thereof, there is seen a diagrammatic, perspective view of an exemplary embodiment of a multiple-structured sheet metal foil 1. The sheet metal foil 1 shown has a primary structure 4, which in this case takes the form of a corrugation 10. This corrugation 10 in particular has a sinusoidal shape and has various extremes 14, with a corrugation peak being disposed next to a corrugation valley. In addition to this corrugation 10, the sheet metal foil 1 has a secondary structure 6. This secondary structure 6 is formed in this case by a baffle 47, which is partially defined by a passage 8. The baffle 47 and the passages 8 have separating edges 2. The secondary structure 6 is formed with a secondary structure width 12, which is less than a first primary structure width, that is to say a width of two adjacent corrugation peaks of the primary structure.

In the case of the illustrated sheet metal foil 1, different orientations of the secondary structure 6 are selected for each row. While the secondary structures 6 shown at the bottom of FIG. 1 are constructed in such a way that their baffles 47 are bent downwards from the upper extreme 14 or the corrugation peak, the secondary structures 6 shown at the top of FIG. 1 have an opposing orientation of the baffles 47 which are directed upwards from the lower extremes 14 or the corrugation valleys. This ensures that such secondary structures 6 will later project in each channel and give rise to a swirling or peeling off of partial exhaust gas flows. An arrow 48, which symbolizes a direction of flow of the exhaust gas, is shown by way of explanation. Thus, when the exhaust gas flows through the channels, which are defined by a sheet metal foil 1 formed in this way, the partial exhaust gas flows will be led through the passages 8 by the baffles 47, or peeled off, and will therefore pass into adjacent channels. In this way, so-called communicating channels are formed, which permit a relatively high level of efficiency with regard to the catalytic conversion of exhaust gases.

Figure 2:
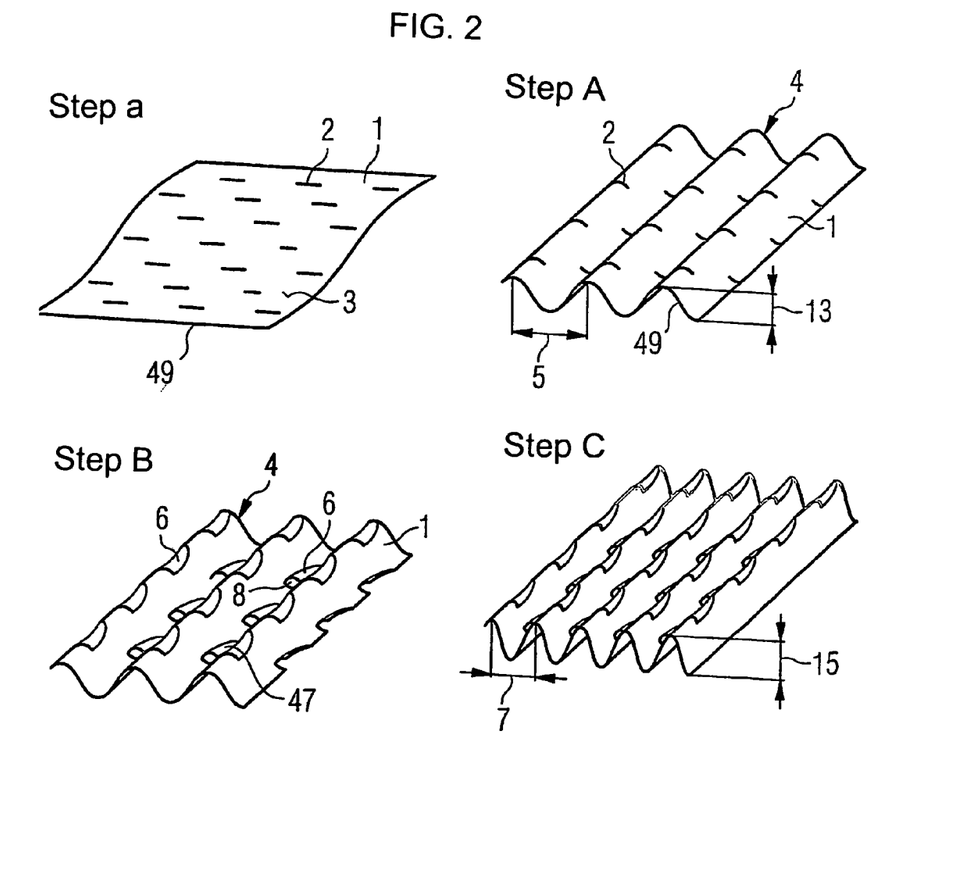
FIG. 2 is a group of perspective views illustrating a sequence of a method for producing a multiple-structured sheet metal foil.

FIG. 2 diagrammatically illustrates a development of a method for producing multiple-structured sheet metal foils. A Step a relates to an introduction of multiple separating edges 2 into an inner area 3 of the basically plane sheet metal foil 1. In the embodiment shown, the separating edges 2 are disposed basically parallel to an edge 49 of the sheet metal foil 1, although this is not necessarily the case. The separating edges 2 may be provided in any configuration relative to one another. The separating edges 2 shown herein are not in the form of holes or the like, but as slits or similar configurations. In a Step A, the sheet metal foil 1 is formed or reshaped for the first time, producing a primary structure 4 having a first primary structure width 5. The sheet metal foil 1 which is already provided with the separating edges 2 is thereafter provided with the primary structure, for example through the use of corrugation rolls. The primary structure is easily recognizable by the edge 49. Two similar, adjacent extremes describe the first primary structure width 5. A further criterion for describing the primary structure 4 is the primary structure height. The first forming or reshaping step gives rise to a first primary structure height 13. A ratio of the first primary structure width 5 to the first primary structure height 13 in this phase is 2.5 or more.

In a further forming or reshaping step B, the secondary structure 6 is introduced into the sheet metal foil 1. The secondary structure 6 which is shown in turn has passages 8 and baffles 47, which are oriented in opposite directions. The secondary structure 6 is superimposed on the primary structure 4.

In an additional forming or reshaping step C, the primary structure 1 is gathered up or reshaped so that a second primary structure width 7 is produced, which is less than the first primary structure width 5. It can be seen from the figure that reducing the primary structure width results in a corresponding enlargement of the primary structure height, that is to say the first primary structure height 13 is less than a second primary structure height 15. With the method shown herein for producing multiple-structured sheet metal foils, it is possible to produce sheet metal foils 1 having a primary structure 4, which has a ratio of a second primary structure width 7 to a second primary structure height 15 of less than 2.

Figure 3:
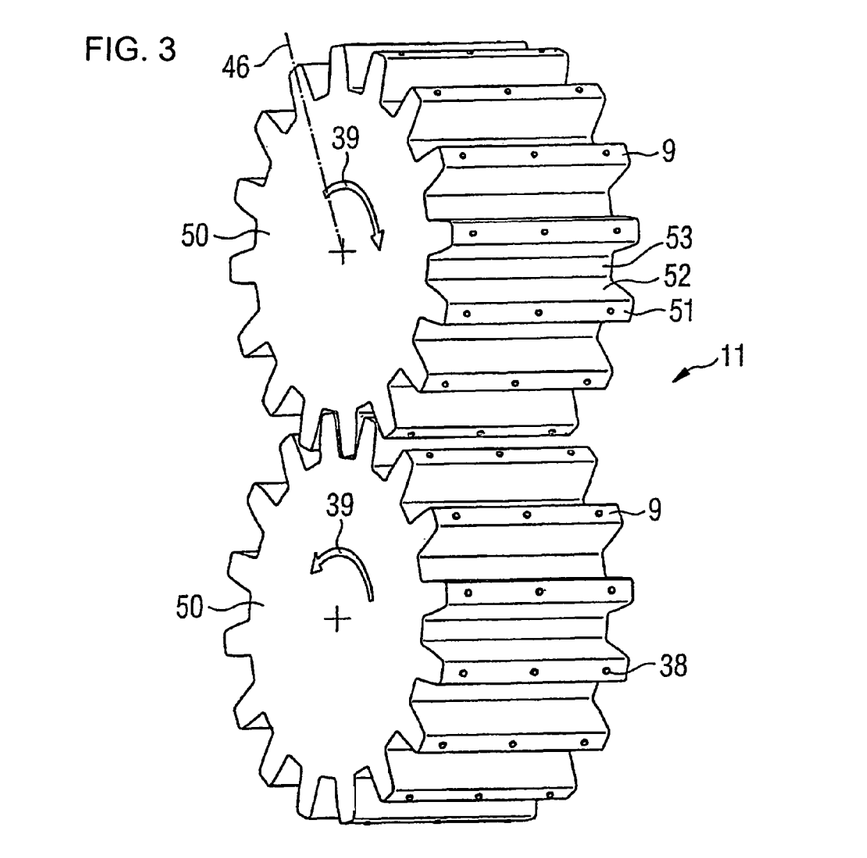
FIG. 3 is a perspective view of an embodiment of a first tool which is provided for producing a primary structure in a sheet metal foil.

FIG. 3 is a diagrammatic, perspective view of a first tool 11, which is used, in particular, for producing a primary structure 4 having a first primary structure width 5. The first tool 11 includes two rolls 50 having profile teeth 9. The rolls 50 are disposed in such a way that the profile teeth 9 of the two rolls 50 intermesh with one another. The initially basically plane or two-dimensional sheet metal foil is pushed through between the meshing profile teeth 9 of the rolls 50, bending the sheet metal foil in different directions. In the process, the extremes of the sheet metal foil are formed between heads 51 of the teeth of one roll 50 and feet or bases 53 of the teeth of the other roll 50. The profile teeth 9 each have a side or flank 52 between the head 51 and the foot 53 which is, for example, aligned parallel to a central axis 46 or may have an involute structural shape. The sheet metal foil 1 (which is not shown in FIG. 3) is carried through the rolls 50 by the rotational movement of the rolls 50 themselves or by a separate feed device. The rolls 50 shown herein furthermore have pins 38 on the heads 51 of the profile teeth 9 which, while in contact with the sheet metal foil 1, simultaneously introduce separating edges 2 into the sheet metal foil 1. This occurs in particular when the head 51 of a profile tooth 9 of the one roll is directly opposite a foot 52 of a profile tooth 9 of the other roll 50. In the process, the separating edges 2 completely pierce, that is to say are formed completely through, the entire material of the sheet metal foil 1, although it is possible to merely score the material, that is to say to form the separating edges 2 only through part of the foil thickness.

Figure 4:
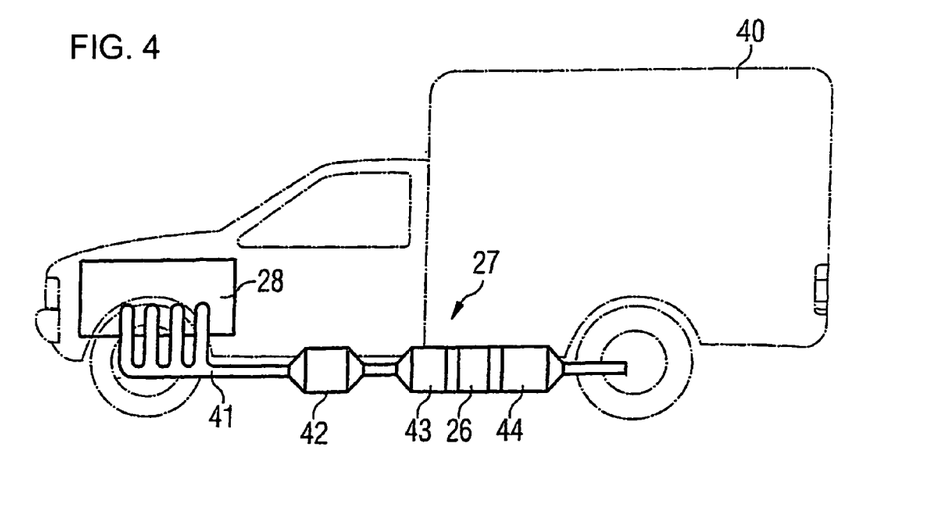
FIG. 4 is a side-elevational view of a vehicle having an exhaust system.

FIG. 4 shows a diagrammatic representation of an exemplary embodiment of an exhaust system 27 of an automobile 40. The exhaust gas generated in an internal combustion engine 28 is fed through an exhaust line 41 to various components for treatment of the exhaust gas. In the exhaust system 27 shown, the following succeed one another in the direction of flow of the exhaust gas: a starting catalytic converter 42, which begins to convert pollutants just a very short time after cold-starting of the internal combustion engine 28, a filter 43 for collecting particulates contained in the exhaust gas, a catalyst carrier body 26, which is provided with the sheet metal foil 1 described herein, and finally a catalytic converter 44, especially a three-way catalytic converter.

Figures 5, 5A:
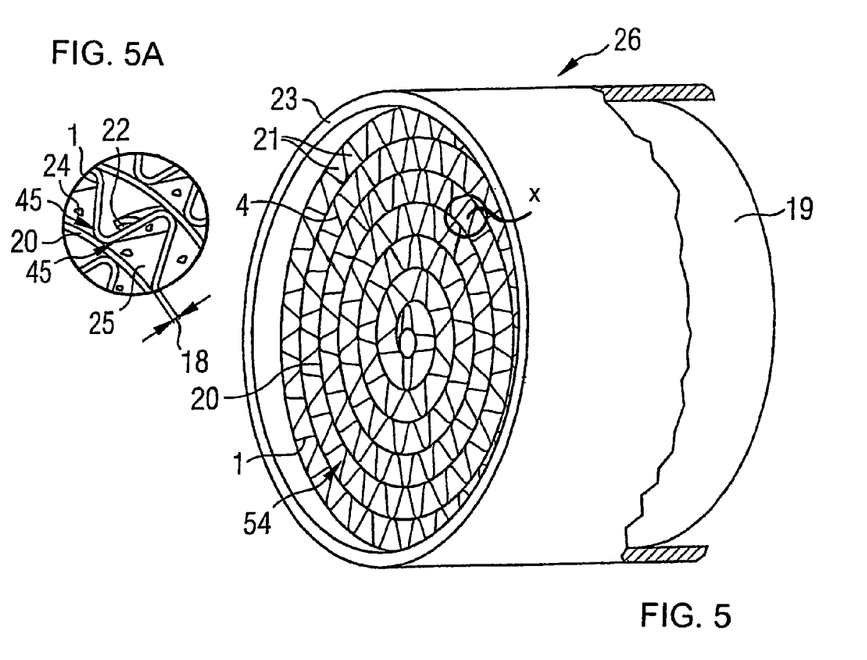
FIG. 5 is a fragmentary, partly broken-away perspective view of an exemplary embodiment of a catalyst carrier body for the treatment of exhaust gases.
FIG. 5A is an enlarged, end-elevational view of a portion X of FIG. 5.

FIG. 5 is a diagrammatic, perspective view of an embodiment of a catalyst carrier body 26. The catalyst carrier body 26 includes at least one honeycomb body 19 having a multiplicity of at least partially structured sheet metal foils 1, 20 together with a casing 23. The honeycomb body has at least one multiple-structured sheet metal foil 1 with a primary structure 4 and a secondary structure 6. The primary structure 4 can be seen very clearly in a view of the catalyst carrier body 26 from an end face 54. In the illustrated embodiment, a multiple-structured sheet metal layer 1 together with a smooth interlayer 20, which is preferably also a sheet metal foil, are helically wound into a cylindrical honeycomb body. In principle, however, other cross-sectional shapes of the honeycomb body 19 are possible, such as polygonal and ellipsoidal body shapes. The adjacent configuration of the sheet metal foil 1 and the interlayers 20 forms channels 21, which are disposed basically parallel to one another and preferably extend over the entire length of the honeycomb body 19. Walls of the channels 21 formed by the sheet metal foils 1, 20 are provided with a catalytically active coating 24, as is seen in the enlarged view of FIG. 5A. The coating 24 is a wash coat 25 impregnated with precious metals. In the enlarged, fragmentary view of FIG. 5A it is also possible to see wedges or angles 45, which may play a central role in the joining technique for the sheet metal foils 1 and the interlayers 20 and in a subsequent coating process.

Upon inspection, the multiple-structured sheet metal foils 1 have a basically corrugated primary structure 4, which is shown as being relatively shallow in this case for the purposes of illustration. Openings 22 etc., which are provided in this case as the secondary structure 6, allow exhaust gas flowing through the honeycomb body 19 to flow from one channel 21 over to another channel 21. The honeycomb body 19 preferably has a channel density of more than 300 cpsi, in particular more than 650 cpsi. The multiple-structured sheet metal foil 1 as well as the interlayer 20 have a foil thickness 18 ranging from 0.01 to 0.05 mm.

Figure 6:
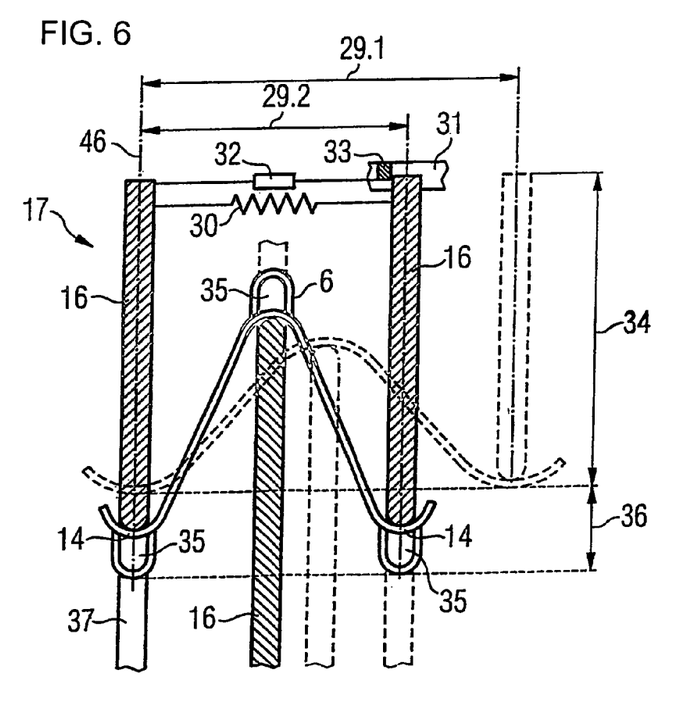
FIG. 6 is a fragmentary, sectional view of a second tool for reducing a primary structure width.

FIG. 6 shows a diagrammatic representation of the structure of a second tool 17 for performing the steps B and C of the method. This tool 17 accordingly serves for producing multiple-structured sheet metal foils 1, and therefore a sheet metal foil having a primary structure 4 (represented by dashed lines) is fed to the tool. At this point in the process, three segments 16 shown in FIG. 6 engage in the primary structure 4 of the sheet metal foil 1, so that they come into contact with the extremes 14. The tool 17 has various measures for reducing the primary structure, which permit a variable configuration of an interval 29 between two adjacent segments 16. The way in which these intervals 29 are varied will be explained below. In the embodiment shown, the segments 16 have a relatively slender structure, defining a central axis 46. In this case, the segments 16 are provided with the same interval 29 over their entire extent 34, since the central axes 46 of the segments 16 are disposed basically parallel to one another. In order to vary the interval 29, there are provided a drive 32, springs 30 and possibly dampers, a guide 31, and possibly stops 33 for limiting the possible variations.

As already stated, the sheet metal foil 1 having a primary structure 4 and a first primary structure width are fed to the tool 17. The segments 16 reaching to the top of FIG. 6 engage in the low points or corrugation valleys of the illustrated corrugated sheet metal foil 1. The segments 16, which are offset in relation thereto and which reach to the bottom of FIG. 6, engage in the high points or corrugation peaks of the sheet metal foil 1. The segments 16, which are disposed on one side of the sheet metal foil 1, have an interval 29.1, which basically corresponds to a first primary structure width 5. In order to reduce the primary structure width, the segments 16 are run towards one another so that a new interval 29.2 is set. In the process, the extremes of the sheet metal foil 1 are shifted closer together. The term "closer" signifies that the extremes succeed one another more closely in the direction of the corrugated shape.

In the embodiment shown, the secondary structures 6 are introduced simultaneously. This is done by providing the segments 16 with embossing elements 35, which perform a stroke 36, at least partially perforating the surface described by the primarily deformed sheet metal foil 1. In the process, the secondary structures 6 are formed, in particular at those points in the sheet metal foil 1 at which the separating edges 2 were previously introduced. For this purpose, it may be necessary to provide a die 37 or a matrix, which permits a corresponding execution of the secondary structure 6, on the side of the sheet metal foil 1 remote from the embossing element 35.

The method for producing multiple-structured sheet metal foils described above overcomes the problems described in relation to the state of the art, and an economical and moreover reliable method is specified for producing extremely thin sheet metal foils. For this purpose, it is necessary to divide the process of reshaping a basically plane sheet metal foil into a multiple-structured sheet metal foil into separate steps, in order to prevent unwanted creases or fissures from occurring in the sheet metal foil. Such creases and fissures might result in a reduced service life of the sheet metal foil used to form surfaces in the carrier body for converting pollutants contained in the exhaust gas. In this respect the proposed method in particular opens up the production of specially formed catalyst carrier bodies having a ratio of primary structure width to primary structure height of less than 2. In this case it has proved particularly advantageous to undertake the reduction of the primary structure width using a special tool, in which the sheet metal foil is guided over its structure. All of these individual components mean that ultimately a catalyst carrier body can be used for exhaust emission control, which even only a short time after cold-starting of the engine has heated up to the point that it can begin to function, and which generates a low back pressure, requires small quantities of coatings and at the same time has a significantly longer service life.

We claim:

1. A method for producing multiple-structured sheet metal foils, which comprises the following steps:
   A) reshaping the sheet metal foil to produce a primary structure having a first primary structure width;
   B) reshaping the sheet metal foil having the primary structure to produce a secondary structure;
   C) reshaping the sheet metal foil simultaneously with or subsequently to reshaping step B) to produce a second primary structure width being less than the first primary structure width;
   carrying out step A) with a first tool;
   engaging extremes of the primary structure with segments of a second tool during reshaping step C);
   setting a first interval between two adjacent segments corresponding to the first primary structure width;
   setting a second interval between said two adjacent segments corresponding to the second primary structure width; and
   producing the second primary structure width by reducing the first interval to the second interval.

2. The method according to claim 1, which further comprises, prior to step A), introducing multiple separating edges into an inner area of the basically plane sheet metal foil in a step a).

3. The method according to claim 2, which further comprises carrying out the step of introducing the separating edges by at least one production process selected from the group consisting of:
   cutting,
   pressing,
   stamping,
   drilling, and
   etching,
   to produce a multiplicity of passages.

4. The method according to claim 2, which further comprises carrying out steps a) and A) with a first tool performing at least one of a cutting production process in step a) or a corrugation rolling production process to produce the primary structure in step A).

5. The method according to claim 1, which further comprises, during the first reshaping step B), bending the sheet metal foil with intermeshing profile teeth, to produce a basically regular, recurring corrugation as the primary structure.

6. The method according to claim 1, wherein the secondary structure width is less than 80% of the first primary structure width.

7. The method according to claim 1, wherein the secondary structure width is less than 55% of the first primary structure width.

8. The method according to claim 1, wherein the secondary structure has a striated construction.

9. The method according to claim 8, wherein the striated construction extends along extremes of the primary structure.

10. The method according to claim 1, wherein the secondary structure has an intermittent construction.

11. The method according to claim 10, wherein the intermittent construction extends parallel to extremes of the primary structure.

12. The method according to claim 1, wherein the secondary structure forms passages in the sheet metal foil.

13. The method according to claim 1, wherein the second primary structure width produced by reshaping step C) is less than 80% of the first primary structure width.

14. The method according to claim 1, wherein the second primary structure width produced by reshaping step C) is less than 60% of the first primary structure width.

15. The method according to claim 1, which further comprises carrying out reshaping step C) to provide a first primary structure height being less than 80% of a second primary structure height.

16. The method according to claim 1, which further comprises carrying out reshaping step C) to provide a first primary structure height being less than 60% of a second primary structure height.

17. The method according to claim 1, which further comprises carrying out reshaping step C) simultaneously with reshaping step B).

18. The method according to claim 1, wherein the multiple-structured sheet metal foils are produced from a high temperature-resistant and corrosion-resistant material having a foil thickness of less than 0.03 mm.

19. The method according to claim 1, wherein the multiple-structured sheet metal foils are produced from a high temperature-resistant and corrosion-resistant material having a foil thickness of less than 0.015 mm.

20. The method according to claim 1, wherein the second primary structure width is less than 3.0 mm.

21. The method according to claim 1, wherein the second primary structure width is less than 2.6 mm.

22. The method according to claim 1, wherein the second primary structure width is less than 2.2 mm.

23. The method according to claim 1, which further comprises producing the primary structure with a second primary structure height of more than 1.5 mm.

24. The method according to claim 1, which further comprises producing the primary structure with a second primary structure height of more than 1.8 mm.

25. The method according to claim 1, which further comprises producing the primary structure with a second primary structure height of more than 2.0 mm.

26. A method for producing a metal honeycomb body having at least partially structured sheet metal foils, the method comprising the following steps:
producing at least one sheet metal foil according to claim 1; and
subsequently at least one of stacking or winding the at least one sheet metal foil to form a honeycomb body having a multiplicity of channels at least partially defined by the primary structure.

27. The method according to claim 26, which further comprises forming openings between adjacent channels during the step of producing the secondary structure.

28. The method according to claim 26, which further comprises producing a channel density per unit area of at least 300 cpsi during the step of at least one of stacking or winding the at least one sheet metal foil.

29. The method according to claim 26, which further comprises producing a channel density per unit area of at least 600 cpsi during the step of at least one of stacking or winding the at least one sheet metal foil.

30. The method according to claim 26, which further comprises forming sheet metal layers during the step of at least one of stacking or winding the at least one sheet metal foil, at least partially enclosing the layers with a casing, and joining the layers to one another and/or to the casing.

31. The method according to claim 30, which further comprises carrying out the joining step by a brazing process.

32. The method according to claim 26, which further comprises forming sheet metal layers during the step of at least one of stacking or winding the at least one sheet metal foil, and joining the layers to one another.

33. The method according to claim 32, which further comprises carrying out the joining step by a brazing process.

34. The method according to claim 26, which further comprises at least partially providing the at least one sheet metal foil forming the honeycomb body with a coating.

35. The method according to claim 34, wherein the coating is catalytically active.

36. The method according to claim 34, wherein the coating is a wash coat.

37. The method according to claim 1, wherein the multiple-structured sheet metal foils are produced from a high temperature-resistant and corrosion-resistant material having a foil thickness of less than 0.05 mm.

* * * * *